United States Patent
Phely

(10) Patent No.: US 10,251,335 B2
(45) Date of Patent: Apr. 9, 2019

(54) WHEEL FORMING AN IMPROVED AGRICULTURAL TOOL

(71) Applicant: OTICO, Chalmaison (FR)

(72) Inventor: Olivier Phely, Thenisy (FR)

(73) Assignee: OTICO, Chalmaison (FR)

( * ) Notice: Subject to any disclaimer, the term of this patent is extended or adjusted under 35 U.S.C. 154(b) by 223 days.

(21) Appl. No.: 14/617,123

(22) Filed: Feb. 9, 2015

(65) Prior Publication Data

US 2015/0223384 A1    Aug. 13, 2015

(30) Foreign Application Priority Data

Feb. 10, 2014    (FR) .................................... 14 51002

(51) Int. Cl.
*A01C 7/20* (2006.01)
*B60B 3/00* (2006.01)
(Continued)

(52) U.S. Cl.
CPC .............. *A01C 7/205* (2013.01); *A01C 5/068* (2013.01); *B60B 7/04* (2013.01); *B60B 25/006* (2013.01);
(Continued)

(58) Field of Classification Search
CPC ....... A01B 15/00; A01B 29/043; A01C 5/068; A01C 7/205; B60B 3/002; B60B 3/08; B60B 5/02; B60B 7/04; B60B 7/004; B60B 7/0046; B60B 23/10; B60B 25/002; B60B 25/04; B60B 27/0005; B60B 25/006; B60B 1/06
(Continued)

(56) References Cited

U.S. PATENT DOCUMENTS

| 921,557 | A | | 5/1909 | Mussetter |
| 1,282,305 | A | * | 10/1918 | Simmons .................. B60B 3/10 301/11.1 |

(Continued)

FOREIGN PATENT DOCUMENTS

| EP | 1 671 811 A1 | 6/2006 |
| GB | 2 180 510 | 4/1987 |

OTHER PUBLICATIONS

U.S. Appl. No. 14/617,086, filed Feb. 9, 2015, Phely.
(Continued)

*Primary Examiner* — Robert E Pezzuto
(74) *Attorney, Agent, or Firm* — Oblon, McClelland, Maier & Neustadt, L.L.P.

(57) ABSTRACT

An agricultural machine tool includes a wheel body which includes a hub, a rim and at least two arms which each connect the hub and the rim to each other. At least one aperture is provided between the two arms and the rim, and has a closed contour. The tool includes a component which forms an accessory having a profiled portion having a shape which generally corresponds to the closed contour, and a generally superficial portion which terminates the profiled portion. The profiled portion is introduced at one side of the wheel body into the aperture, closing the aperture by form-fitting cooperation. A set of fixing members ensures the retention of the component in a final position, in which the superficial portion moves into a flush state with the arms, at least in the region of the contour.

13 Claims, 5 Drawing Sheets

(51) Int. Cl.
*A01C 5/06* (2006.01)
*B60B 7/04* (2006.01)
*B60B 25/00* (2006.01)
B60B 1/06 (2006.01)
B60B 5/02 (2006.01)

(52) U.S. Cl.
CPC .............. *B60B 1/06* (2013.01); *B60B 5/02* (2013.01); *B60B 2900/113* (2013.01); *B60B 2900/115* (2013.01); *B60B 2900/325* (2013.01); *B60B 2900/3312* (2013.01)

(58) Field of Classification Search
USPC .......... 111/194; 172/519, 538, 536; 152/453, 152/454, 456, 523; 301/37.42, 37.101, 301/37.106, 37.28, 64.303, 64.305
See application file for complete search history.

(56) References Cited

U.S. PATENT DOCUMENTS

| 2,152,957 | A | * | 4/1939 | Fortney | B60B 25/04 301/64.303 |
|---|---|---|---|---|---|
| 2,731,900 | A | * | 1/1956 | Oehler | A01C 5/068 152/453 |
| 2,848,278 | A | * | 8/1958 | Todd | B60B 3/08 152/327 |
| 4,733,730 | A | * | 3/1988 | Murray | A01C 5/068 111/135 |
| 5,533,793 | A | * | 7/1996 | Walker | B60B 3/002 152/453 |
| 6,295,939 | B1 | * | 10/2001 | Emms | A01C 5/068 111/194 |
| 6,517,168 | B1 | * | 2/2003 | Van Houten | B60B 7/004 301/37.101 |
| 7,246,860 | B1 | * | 7/2007 | Seitz | B60B 7/0046 220/789 |
| 2004/0195905 | A1 | * | 10/2004 | French, III | B60B 7/00 301/37.28 |

OTHER PUBLICATIONS

U.S. Appl. No. 14/617,033, filed Feb. 9, 2015, Phely et al.
French Preliminary Search Report dated Oct. 22, 2014 in French Application 14 51002, filed on Feb. 10, 2014 (with English Translation of Categories of Cited Documents).

* cited by examiner

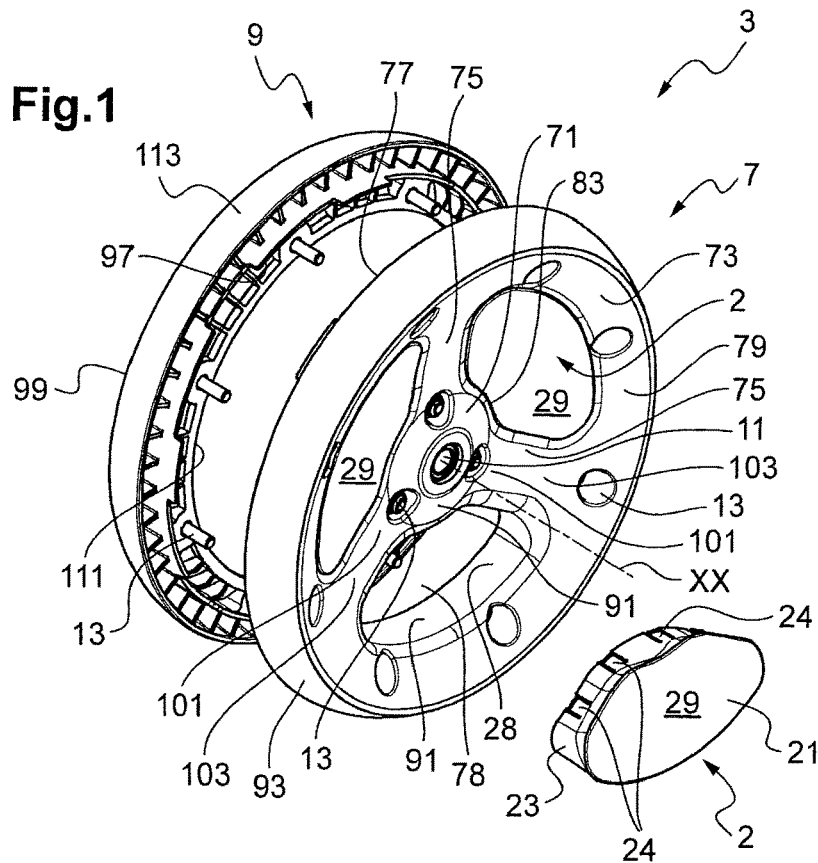
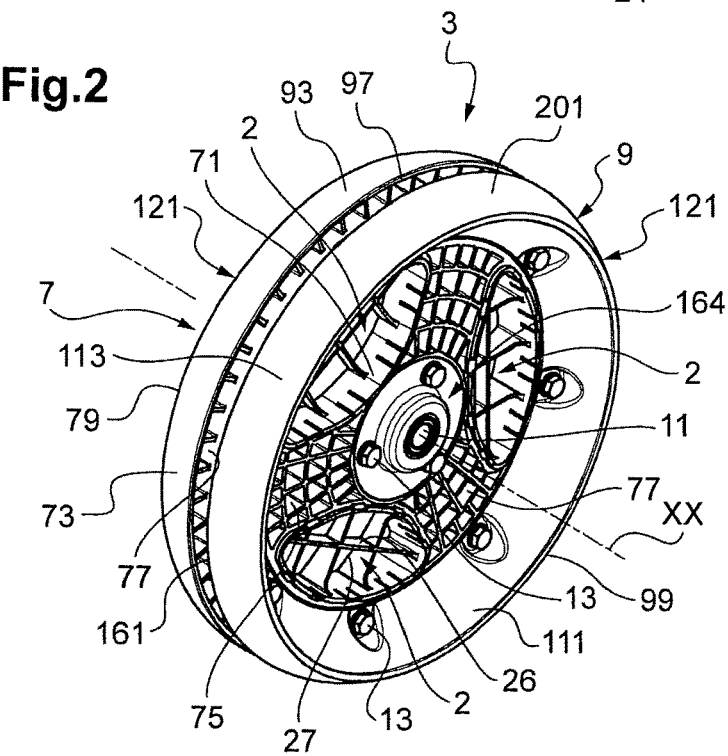

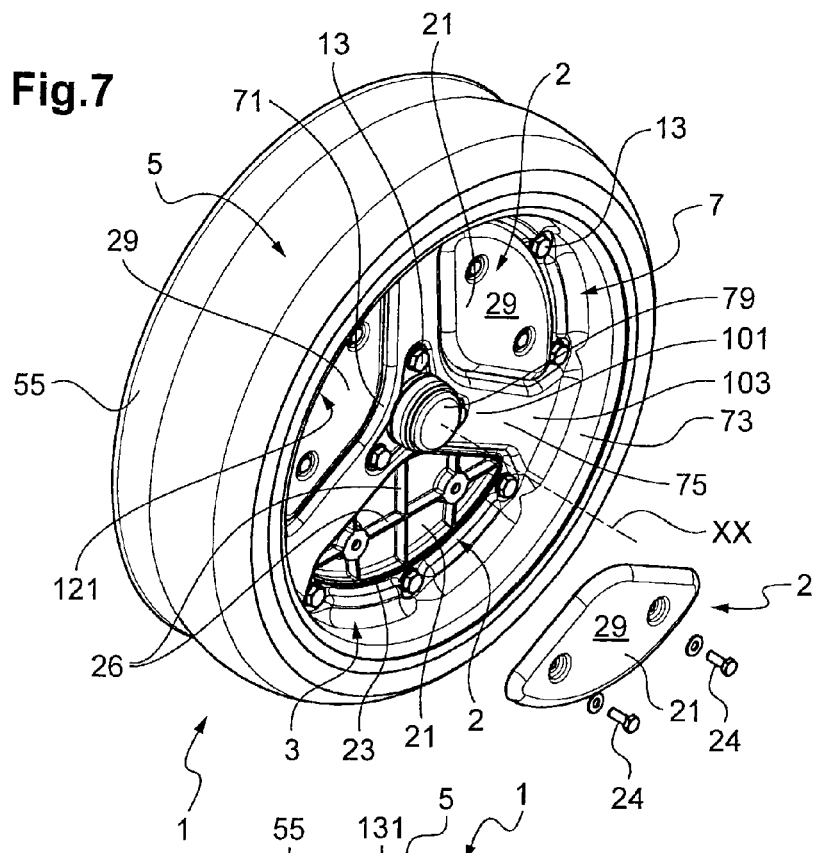
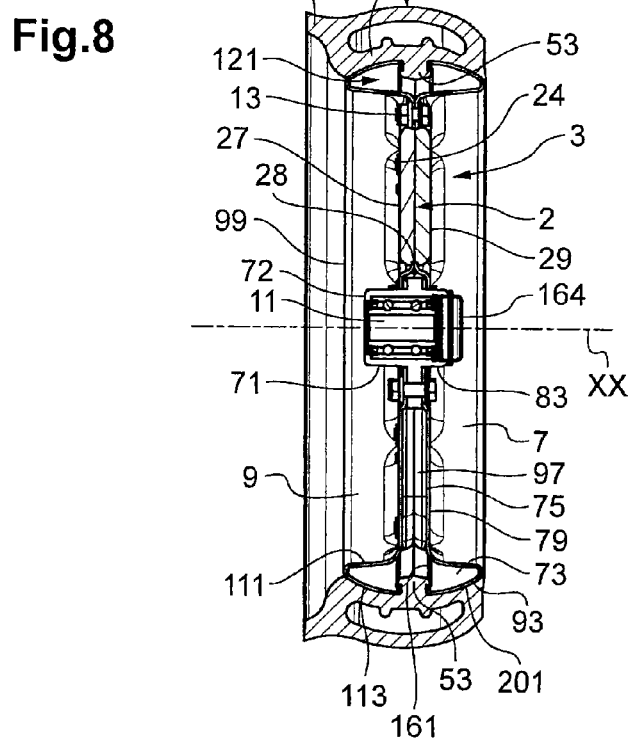

WHEEL FORMING AN IMPROVED AGRICULTURAL TOOL

BACKGROUND OF THE INVENTION

Field of the Invention

The invention relates to agricultural tools and more particularly tools comprising mainly one or more wheels.

In tools of this type, the wheel(s) is/are generally used to work the soil. The wheels may operate alone or in conjunction with other portions of the tool.

In the case of a sowing machine, for example, the tool comprises a portion which is provided to open a furrow in the soil, typically a ploughshare, a disc or a tooth, and one or more wheel(s) in order to close the furrow and/or to pack the earth after the seeds have been deposited at the bottom of the furrow.

Some tools, such as the above-mentioned sowing machine, also comprise so-called "depth control" wheels which control the working depth of the remainder of the tool. In the case of a tool comprising a ploughshare, for example, depth control wheels are mounted so as to be fixedly joined to the ploughshare so that, whilst travelling over the ground, the wheels retain the active portion of the ploughshare at a substantially constant depth.

Most often, the wheels with which agricultural tools are provided are intended to travel on the ground. They thus comprise a tire which is mounted around a portion of the wheel which forms the body thereof.

In order to prevent the tire from becoming disconnected from the wheel body during work, the portion of the wheel body which forms the rim is formed in a particular manner. This results in generally complex forms which complicate the production of the wheel body and also the mounting of the tire thereon.

That is the reason for which the wheels often comprise two similar flanges which are mounted one on the other in order to form the body of the wheel. The flanges are assembled one on the other by means of one of the main faces thereof, with the tire being enclosed.

Description of Related Art

In FR 2933903, the Applicant proposed an innovative wheel, whose shape of the wheel body prevents the tire from becoming detached from the rim during operation, including under extreme conditions. The body in question is formed by the mutual assembly of two similar flanges in a state face to face.

When they are used as tools, the wheels are generally subjected to great loads during operation.

In some cases, in particular when a sowing machine is provided therewith, the orientation of the wheel in the machine does not correspond to the advance direction of the machine: it is often the case that the wheel is inclined to a great extent in relation to the advance direction. Furthermore, the wheel may be inclined in relation to the vertical relative to the ground. During operation, this results in very great stress on the wheel body.

Some of those wheels comprise a rim and a hub which are connected by arms. The arms ensure the mechanical connection and the transmissions of forces necessary for the operation of the wheel whilst leaving passages free between the arms. The wheel is thus an open-disc type wheel.

Open-disc type wheels require few raw materials and are light. The free passages make one side of the wheel accessible from the opposite side. For example, an operator can reach down to the bottom of a wheel passage of an agricultural machine without disassembling the wheel from its axle.

The free passages are generally sufficient for an operator to introduce his hands, his arms and tools therein. An operation for cleaning the machine and the wheels is rapid and efficient, for example, by means of a pressurized water device. This may be particularly appreciated for cleaning and maintaining machines which are used on sticky and muddy soils, such as sowing machines: the accumulations of earth which tend to harden and damage the machine may be readily removed.

Agricultural machines provided to travel over ground covered with straw and dry residues generally have solid-disc type wheels. The rim and the hub are thus connected to each other by a solid disc.

Solid-disc type wheels prevent the appearance of air flows through the wheels. Solid discs prevent the production or amplification of occurrences of turbulence of air around the machine during movement. If open-disc type wheels were used, the arms would behave in an illustrative manner like the blades of a fan. Consequently, the dry residues would be carried along and clouds of dust would be produced. Such clouds of dust impair the driver of the machine, reducing his visibility, making the air difficult to breathe and rapidly making the machine dirty. This also leads to pollution of the adjacent plots of land.

Open-disc type wheels of agricultural machines provided for working moist soil are poorly adapted to travel over ground which is covered with straw and dry residues.

An objective of the Applicant is to improve the situation.

BRIEF SUMMARY OF THE INVENTION

The Applicant proposes an agricultural machine tool of the type comprising a wheel body which includes a hub, a rim and at least two arms which each connect the hub and the rim to each other. At least one aperture is provided between the two arms and the rim and has a closed contour. The tool further comprises a component which forms an accessory having a profiled portion having a shape which generally corresponds to the closed contour, and a generally superficial portion which terminates the profiled portion and a set of fixing members. The profiled portion is introduced at one side of the wheel body into the aperture, closing the aperture by means of form-fitting cooperation, as far as a final position in which the superficial portion moves into a flush state with the arms, at least in the region of the contour, whilst the set of fixing members ensures the retention of the component in that final position.

Such a tool allows the solid or open nature of the wheel disc to be freely adapted in accordance with the situations. For example, the apertures may be closed during work in fields in order to prevent the production of clouds of dust and in order to protect the tools from becoming clogged. The accessories may be removed during maintenance and in particular for making it easier to clean the tools. The same wheels may be used on moist or sticky soil and on dry soils by modifying the properties of the wheels, in particular the aerodynamic properties, by fixing and removing the accessories.

The tool may have the following optional features, taken alone or in combination with each other:

the wheel body and/or the accessory comprise(s) an engaging member for a tool or fingers. The engaging member is configured to allow the withdrawal of the accessory from the wheel body by pulling from one of the two faces of the wheel body. The withdrawal of the accessory is thus facilitated from one of the faces of the wheel, the accessory is formed from at least two components. The two components and the set of fixing members are configured so as to assemble the two components one on the other in a removable manner, enclosing the contour of the aperture. The retention of the accessory on the wheel body is improved. The risk of accidentally becoming detached during operation is reduced, the accessory comprises at least two similar, generally superficial portions, each of the generally superficial portions closing a respective aperture. The accessory may be in the form of a cluster which is capable of closing each of the apertures of the wheel body. A single accessory is sufficient for closing the wheel disc, the generally superficial portion is transparent. A user may visually inspect the interior of the wheel body without removing the accessory. An anomaly may be detected more rapidly, the set of fixing members comprises at least one fixing lug, the removability of the fixing member being allowed by the resilient deformation of the fixing lug. The set of fixing members may thus be produced at the same time as the generally superficial portion. For example, the accessory and the set of fixing members may be produced as a monobloc component. The risk of losing the fixing members during maintenance operations is prevented, the aperture is delimited by respective edges of the two arms and the rim. The accessory may thus be fixed directly to the two arms and to the rim. The fixing of the accessory to the wheel body is improved, the accessory comprises reinforcement ribs which are carried by a surface of the generally superficial portion, the reinforcement ribs contributing to reinforcing the generally superficial portion. The generally superficial portion thus has greater resistance to deformation and impacts, for example, in the event of stones being thrown during operation, the wheel body is formed by the assembly of a first flange and a second flange which are mounted one on the other. The first flange comprises a central portion, a peripheral portion of generally annular form and at least two arms which connect the central portion and the peripheral portion to each other. The second flange is homologous to the peripheral portion of the first flange. In the assembled state, the wheel body has a rim which is formed together by the peripheral portion of the first flange and the second flange and a hub which is formed by the central portion of the first flange. The first flange and the second flange are fixed to each other and the accessory is fixed to the first flange. The accessory may be assembled on and disassembled from the wheel body, whether the second flange and the first flange are in the assembled or non-assembled state.

According to another aspect, the Applicant proposes an adaptation kit. The kit comprises at least one accessory which is removably fixed to an existing wheel body so as to form a tool as defined above.

The removable fitted components which the accessories constitute are inexpensive and may be adapted to existing wheel bodies. Such tools become effective for applications which previously required a second machine or at least other wheels.

BRIEF DESCRIPTION OF THE DRAWINGS

Other features, details and advantages of the invention will be appreciated from a reading of the following detailed description and the appended drawings, in which:

FIG. 1 is an exploded, perspective view of a tool according to the invention in which the tire is not illustrated, FIG. 2 is a view of the tool of FIG. 1 from another point of view and in an assembled state, FIG. 7 is a view, similar to FIG. 4, of another embodiment of the invention and FIG. 8 is a cross-section of the embodiment of FIG. 7.

DETAILED DESCRIPTION OF THE INVENTION

Figure 3:
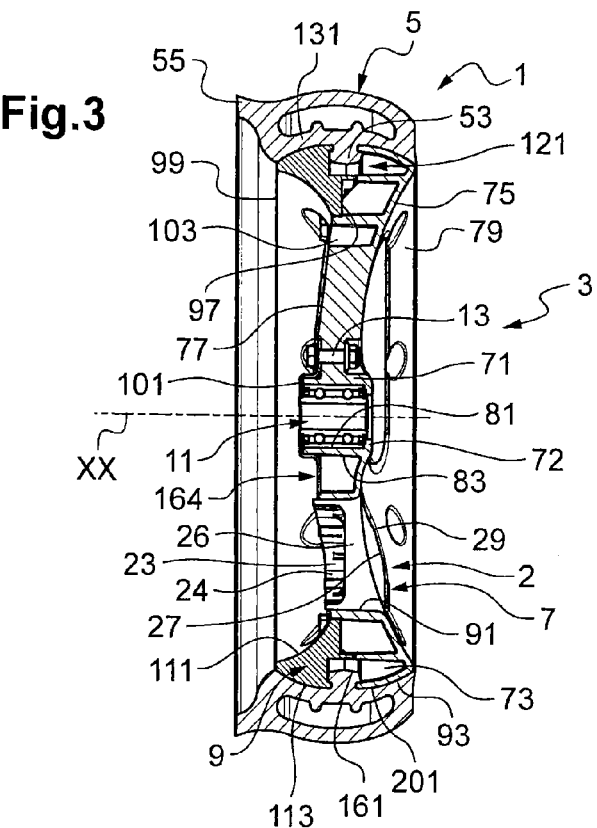
FIG. 3 is a cross-section of the tool of FIG. 1, in which the tire is mounted on the wheel body.

The drawings and the description below mainly contain elements of a specific nature. Therefore, they may not only be used to better understand the present invention, but may also contribute to the definition thereof, where applicable.

FIGS. 1 to 4 show a field working tool in the form of a wheel 1. The wheel 1 comprises a wheel body 3, around which a tire 5 is mounted. FIG. 1 shows the wheel body 3 before assembly. FIG. 2 shows the wheel body 3 before the tire 5 has been mounted thereon.

In the remainder of the description, the term "body" or "wheel body" is used to refer to the practically non-deformable portion of the wheel as opposed to the deformable portion which the tire constitutes. The term "rim" or "wheel rim" is used to refer to the portion which is located at the periphery of the wheel body and which is intended to support the tire. The remainder of the wheel body may be referred to as the "disc", "wheel disc", "dish" or "wheel dish". In other words, the wheel body is constituted by the rim and the wheel disc. In this instance, the term "rim" is not intended to refer to the whole of the wheel body unlike the use, which is incorrect, which may be made thereof generally.

The wheel body 3 is formed by a first flange 7 and a second flange 9 which are generally circular. The first flange 7 and the second flange 9 which are illustrated separately in FIG. 1 are assembled one on the other in order to form the wheel body 3 as illustrated in FIG. 2.

The first flange 7 and the second flange 9 each have a center axis or axis of revolution. Those center axes are aligned in the assembled state and coincide with the axis of rotation of the wheel 1 during operation. Those axes are designated XX in the Figures.

The first flange 7 and the second flange 9 each have an internal face 77 and 97, respectively, and an opposing external face 79 and 99, respectively. During the assembly of the first flange 7 and the second flange 9 one on the other, the internal faces 77 and 97 are placed face to face. The external faces 79 and 99 are orientated opposite to each other toward the outer side of the wheel body 3.

The first flange 7 and the second flange 9 are fixed, in this instance in a reversible manner, to each other in order to form the wheel body 3 by means of fixing members. In the example described here, the fixing members comprise screw/nut pairs 13. The screw/nut pairs 13 allow the first flange 7 and the second flange 9 to be held together. In this instance, screw/nut pairs 13 are distributed in accordance with the periphery of the wheel body whilst screw/nut pairs 13 are distributed in the region of the center of the wheel body 3. Instead or in addition, other fixing means may be used, for example, clips or rivets.

The first flange 7 comprises a central portion 71, a peripheral portion 73 and at least two arms 75 which connect the central portion 71 to the peripheral portion 73. In this instance, the first flange 7 comprises three arms 75.

The central portion 71 is generally generated by revolution. In the assembled state, the central portion 71 forms the hub of the wheel 1. The central space of the revolution type shape of the central portion 71 is capable of receiving an axle or an axle stub which are intended to support the wheel 1 so as to rotate freely about the rotation axis XX. The wheel 1 comprises a rotary bearing which is received in the central portion 71, in this instance in the form of a ball bearing 11. Here, the bearing 11 comprises a double row of oblique contact balls and is received in a cartridge. The cartridge is generally of cylindrical external form. The diameter of the bearing 11 is constant. In a variant, the ball bearing 11 may be replaced by other types of bearing and more generally by a bearing of a different type, such as a plain bearing, for example.

The central portion 71 has an internal surface 81 which is generally orientated toward the main axis XX and which here forms a hole which is capable of receiving the bearing 11. The central portion 71 has a peripheral external surface 83 which is opposite the internal surface 81.

The peripheral portion 73 is generally of annular form. The peripheral portion 73 is delimited in the direction of the main axis XX by an internal edge and an external edge. The peripheral portion 73 and the central portion 71 are substantially concentric and centered about the main axis XX. The peripheral portion 73 surrounds the central portion 71. In the example illustrated in FIG. 3, the peripheral portion 73 and the central portion 71 are offset relative to each other in the direction of the main axis XX. At the side of the internal face 77 (on the left in FIG. 3), the central portion 71 projects in the main direction XX in relation to the internal edge of the peripheral portion 73 by practically the entire length of the central portion 71. At the side of the external face 79 (on the right in FIG. 3), the central portion 71 is arranged so as to be recessed with respect to the external edge of the peripheral portion 73. The external end of the central portion 71 is almost aligned with the internal edge of the peripheral portion 73. In a variant, the peripheral portion 73 and the central portion 71 may be substantially coplanar in accordance with a plane perpendicular to the main axis XX.

The peripheral portion 73 has an internal surface 91, or diametrically internal surface, which is generally orientated toward the central portion 71 and an external surface 93, or diametrically external and peripheral surface, opposite the internal surface 91. In this instance, the internal surface 91 has a generally cylindrical form which is interrupted by the arms 75. In this instance, the external surface 93 has a generally annular form with a profile which is rounded and curved in an outward direction.

Each arm 75 has an internal end 101 which is connected to the central portion 71 at the external surface 83 thereof and an external end 103 which is opposite the internal end 101 and which is connected to the peripheral portion 73 at the internal surface 91 thereof. Thus, each arm 75 connects the central portion 71 and the peripheral portion 73 to each other. The arms 75 extend radially. They form radii of the wheel 1.

In this instance, the internal end 101 of each of the arms 75 is connected to the external surface 83 substantially over three-quarters of the length of the central portion 71 in the direction of the main axis XX. The arms 75 have a thickness in the direction of the main axis XX which decreases slightly then increases in a regular manner from the central portion 71 as far as the external end 103, where it is at a maximum and substantially equal to the thickness of the peripheral portion 73. In this manner, the external end 103 of each arm 75 is substantially aligned with the peripheral portion 73, to which it is connected. The central portion 71 projects relative to the plane defined by the internal edge of the peripheral portion 73. The portion of the internal face 77 of the first flange 7 defined by the arms 75 generally has a frustoconical form which connects the internal ends of the central portion 71 and the peripheral portion 73 to each other. The portion of the external face 79 of the first flange 7 defined by the arms 75 is substantially concave, in the form of a cup which is centered on the main axis XX. The external end of the central portion 71 projects slightly into the bottom of the cup-like form.

Spaces 78 are defined between the arms 75 and the internal surface 91 of the peripheral portion 73. The distribution of the arms 75 around the central portion 71 defines the same number of intervening spaces 78. Those spaces 78 are free and extend through in the direction of the main axis XX from the internal face 77 to the external face 79. When they are left free, the spaces 78 make it easier for debris and mud to be discharged through the first flange 7. The arms 75 and the intervening spaces 78 thus together form an open disc of a wheel.

The arms 75 are regularly distributed in an angular manner about the main axis XX. In the examples described here, there are three arms which are spaced apart from each other by 120°. That configuration ensures sufficient mechanical strength for the applications envisaged whilst allowing economy of material in relation to a solid disc of a wheel. In variants, the number and/or distribution of the arms 75 may be different.

In the examples described here, the first flange 7 is formed as a monobloc component. The first flange 7 is obtained, for example, by injection molding. In this instance, the first flange 7 is produced from plastics material, for example, polyamide, such as polyamide 6-6, or polypropylene. The first plastics flange 7 has low costs in terms of raw materials and production. Nevertheless, the first flange 7 may also be produced from metal. Thus, the first metal flange 7 has improved resistance to impacts, for example, in the event of stones being thrown during the movement of the machine.

As appears in FIGS. 2 and 3, the first flange 7 may be in the form of a casing which is consolidated by internal reinforcement walls, or ribs, between which multiple cavities are left empty. The ribs confer on the first flange 7 good mechanical strength which is comparable to a solid metal component and/or a solid plastics component. They ensure the necessary mechanical strength with few raw materials. The volume occupied by the first flange 7 is mainly hollow.

Where applicable, the number, distribution and form of the ribs may be adapted in accordance with the mechanical strength desired for the first flange 7. Modeling tools of the finite element type may be used.

The central portion 71 receives the bearing 11. During assembly, the bearing 11 is mounted coaxially with respect to the main axis XX of the wheel body 3. The bearing 11 is retained in this position by means of the housing so that the main axis XX of the wheel body 3 coincides with the rotation axis of the wheel 1 during use.

In the example described here, the internal surface 81 of the central portion 71 of the first flange 7 is in the form of a cylindrical through-hole in accordance with the main axis XX. The diameter of the cylindrical hole corresponds to the diameter of the external cylindrical shape of the bearing 11.

In the example of FIG. 3, the central portion 71 of the first flange 7 is configured so as to allow a translation movement of the bearing 11 in accordance with the main axis XX in the absence of a fitted component 164. In this manner, the bearing 11 may be readily inserted into and removed from the housing thereof.

The central portion 71 further comprises an axial stop 72 which is configured so as to limit the translation movement of the bearing 11. The axial stop 72 is formed in this instance at the side of the external face 79 of the first flange 7.

Consequently, the insertion and removal of the bearing 11 may be carried out at the opposite side. The axial stop 72 allows control of the positioning of the bearing 11 in relation to the first flange 7. The axial stop 72 may be considered to be a bottom of the housing.

The wheel 1 further comprises the fitted component 164 or shell. The fitted component 164 is formed so as to be fixed to the wheel body 3, enclosing the bearing 11 which is received in the central portion 71 of the first flange 7. In this instance, the fitted component 164 is generally in the form of a disc, in which a circular central opening is provided. In this instance, the fitted component 164 is produced by stamping a piece of sheet metal. In the installed state, the fitted component 164 partially covers the central portion 71.

The fitted component 164 is fixed at the open side of the housing for the bearing 11, that is to say, here, at the side of the internal face 77. The fitted component 164 is fixed with the screw/nut pairs 13 which are arranged in the region of the center of the wheel 1. Once fixed against the central portion 71, the fitted component 164 forms a cover of the housing and an axial stop for the bearing 11. The bearing 11 is enclosed inside the housing. The opening at the center of the fitted component 164 allows the introduction of an axle for mounting the wheel 1 on an agricultural machine. During operation, the fitted component 164 ensures the axial retention of the bearing 11.

In the embodiment of FIGS. 1 to 4, the bearing 11 may be removed from the housing thereof without it being necessary to disassemble the two flanges 7, 9, for example, in order to be replaced during maintenance. The disassembly of the fitted component 164 is sufficient for opening the housing and releasing the bearing 11.

The fitted component 164, at least partially covering the hub, protects it from the environment. For example, the fitted component 164 protects the hub and the bearing 11 which is received therein from the impacts resulting from small stones being thrown during operation. The fitted component 164 also protects from stress and friction which may result from the accumulation of dried earth near the moving portions of the wheel 1. The fitted component 164 prevents contamination of the bearing 11 with foreign bodies.

The second flange 9 is homologous to the peripheral portion 73 of the first flange 7. The second flange 9 has a generally annular form. The second flange 9 does not have any arms or a central portion forming a hub. The second flange 9 has an internal surface 111 which is homologous to the internal surface 91 of the first flange 7 and which is generally orientated toward the rotation axis XX and an external surface 113 which is homologous to the external surface 93 of the first flange 7 and which is opposite the internal surface 111. The internal surface 111 of the second flange 9 and the internal surface 91 of the first flange 7 operate in a similar manner.

In the example illustrated in the Figures, the second flange 9 is in the form of a ring which has a solid cross-section and which is generally triangular. One of the sides of the triangle-like form carries the external surface 113 which is homologous to the external surface 93 of the peripheral portion of the first flange 7. The external surface 113 has a generally annular form with a profile which is rounded and curved toward the outer side.

During the assembly of the two flanges 7, 9 one on the other, the spaces 78 of the first flange 7 move opposite the internal free space of the annular form of the second flange 9. Therefore, the spaces 78 remain through-spaces. The wheel body 3 thus has an open-disc wheel.

In the examples described here, the second flange 9 is formed as a monobloc component. The second flange 9 is obtained by molding. The second flange 9 is in the form of a collar or peripheral rim. In a variant, the second flange 9 may be obtained by stamping or drawing from a metal sheet. In this instance, the second flange 9 is produced from metal, for example, steel. In a variant, aluminum may be used. The second flange 9 has high mechanical strength. Nevertheless, the second flange 9 may also be produced from a plastics material, for example, similar to the one of the first flange 7.

The first flange 7 of plastics material has a low production cost while the second flange 9 of metal confers on the wheel body 3 the mechanical strength necessary for working in fields. Nevertheless, the two flanges 7, 9 may both be produced from metal, for example, when the mechanical stress anticipated are severe, or both from plastics material, for example, when the mechanical stress anticipated are moderate. The general configuration of the wheel body 3 formed by the first flange 7 and the second flange 9 allows adaptation of the mechanical behavior of the wheel body 3, adapting the materials used without affecting the general configuration of the wheel body 3. In a variant, the first flange 7 and/or the second flange 9 may be produced by assembling a plurality of components rather than by means of a monobloc component. For example, the peripheral portion 73 of the first flange 7 and/or the second flange 9 may be formed from a plurality of annular sections.

Once the two flanges 7, 9 have been mutually assembled the wheel body 3 has a rim 121 which is formed together by the peripheral portion 73 of the first flange 7 and the second flange 9, which portion is homologous to the peripheral portion 73. Thus, the rim 121 has an external surface which is formed together by the external surface 93 of the peripheral portion 73 of the first flange 7 and by the homologous external surface 113 of the second flange 9. That external rim surface forms a seat 201 of a wheel body 3. The seat 201 receives the tire 5.

In the example described here, once the tire 5 has been fitted on the rim 121, the first flange 7 and the second flange 9 support the tire 5, each one substantially by a half here. The surface-area of the external surface 93 of the first flange 7 covered by the tire 5 is substantially equivalent to the surface-area of the homologous external surface 113 of the second flange 9 covered by the tire 5. The first flange 7, the second flange 9 and the tire 5 are mutually configured so that the radial force applied by the tire 5 which surrounds the wheel body 3 is substantially distributed in an equivalent manner over the two flanges 7, 9. In this instance, neither the first flange 7 nor the second flange 9 has the sole function of blocking the tire 5 in the direction of the main axis XX. In a variant, the distribution of the forces may be unbalanced, for example, up to a ratio of 4 to 1.

The tire 5 comprises a sole 131 in abutment with the seat 201 of the rim 121. The configurations of the sole 131, on the one hand, and the seat 201, on the other hand, are selected so as to correspond, substantially with form-fitting correspondence. During operation, the tire 5 is retained around the wheel body 3. The risk of accidental detachment from the rim is low even under difficult conditions.

In the examples described here, the tire 5 is a tire of the semi-hollow type. The tire 5 is of the non-inflatable type. The internal space between the sole 131 and the running tread profile is in fluid communication with the exterior via an opening which is not illustrated. This allows greater deformation of the tire 5 during operation, thereby making it easier to remove mud.

In the embodiments illustrated in the Figures, the seat 201 has a diameter which varies in the direction of the main axis XX. The seat 201 has a form which is not strictly cylindrical. In the region of the interface between the first flange 7 and the second flange 9, that is to say, in the region of the internal faces 77, 97, the diameter of the seat 201 is substantially different from the diameter of the seat 201 in the region of the opposing faces, that is to say, the external faces 79, 99. This can be seen in FIG. 3 as a cross-section. Thus, portions of the seat 201 oppose the axial movement of the tire 5. The risk of accidental detachment from the rim is particularly small. The addition of a specific component forming a blocking wall is unnecessary.

In the examples described here, in the region of the interface between the first flange 7 and the second flange 9, the diameter of the seat 201 is greater than the diameter of the seat 201 in the region of the opposing faces of the flanges 7, 9 with the exception of a groove 161. The seat 201 thus has a generally convex form. That configuration allows, for example, the use of tires whose sole 131 is concave and covers a convex seat 201 by partially surrounding it. Such tires are described, for example, in FR 2 933 903.

In a variant, in the region of the interface between the first flange 7 and the second flange 9, the diameter of the seat 201 is less than the diameter of the seat 201 in the region of the opposing faces. The seat 201 thus has a generally concave form. The seat 201 has surfaces which oppose the axial displacement of the tire 5.

Furthermore, the peripheral portion 73 of the first flange 7 and the second flange 9 are mutually formed so that the assembly thereof defines the groove 161. The groove 161 extends substantially over the circumference of the wheel body 3, at the interface of the peripheral portion 73 of the first flange 7 and the second flange 9. The groove 161 is capable of receiving a corresponding bead 53 of the tire 5. The retention of the tire 5 around the wheel body 3 is further improved.

In each of the embodiments illustrated in the Figures, the wheel body 3 is asymmetrical. In particular, the hub formed by the central portion 71 of the first flange 7 is offset in relation to the center of the wheel body 3 in accordance with the main axis XX. The hub of the first flange 7 at least partially extends into the internal space defined by the annular form of the second flange 9, to a greater or lesser extent in accordance with the embodiments. That feature is optional but allows better balancing of the tool 1 once it is installed on the remainder of the machine.

Figure 4:
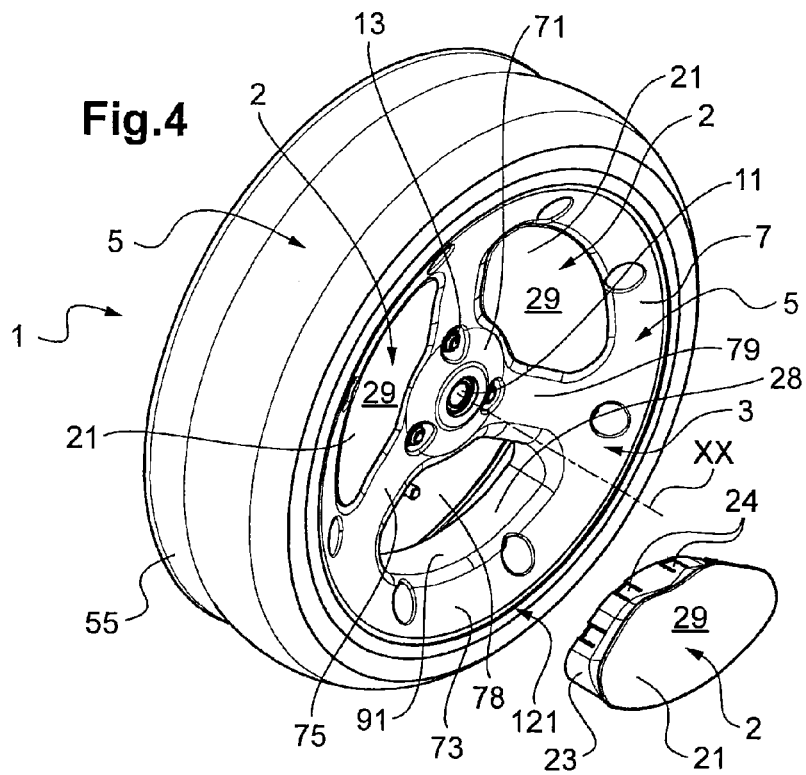
FIG. 4 is a view similar to FIG. 1, in which the tire is mounted on the wheel body.
Figure 5:
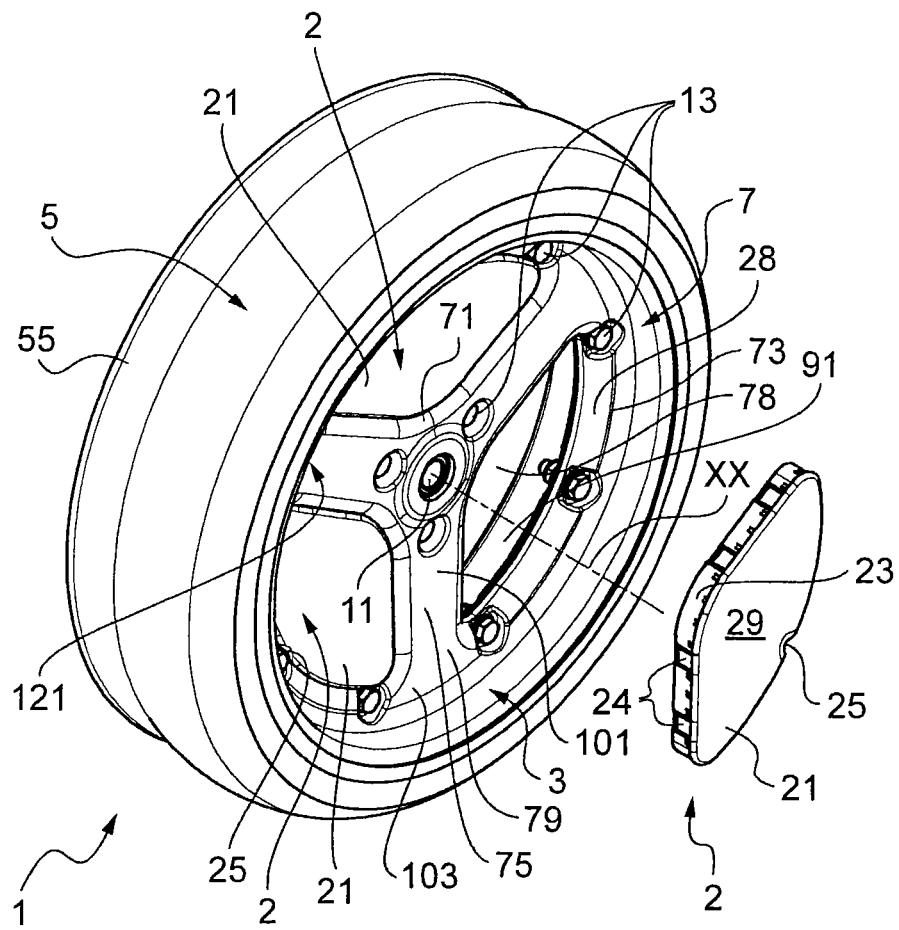
FIG. 5 is a view similar to FIG. 4 of another embodiment according to the invention

The tire 5 as illustrated in FIGS. 3 to 5 has an asymmetrical profile. The sole 131 and the seat 201 each have a plane of symmetry perpendicular to the main axis XX. The portion of the tire 5 opposite the sole 131, the running tread profile, is asymmetrical. The running tread profile has a lip 55. The lip 55 projects from the tire 5 substantially in the direction of the main axis XX, toward the outer side at the side of the external face 99 of the second flange 9. The lip 55 extends substantially over the circumference of the tire 5. Such a wheel 1 provided with a tire 5 having a lip 55 is provided to be installed on a machine as schematically illustrated in FIGS. 6A to 6D.

Figure 6A:
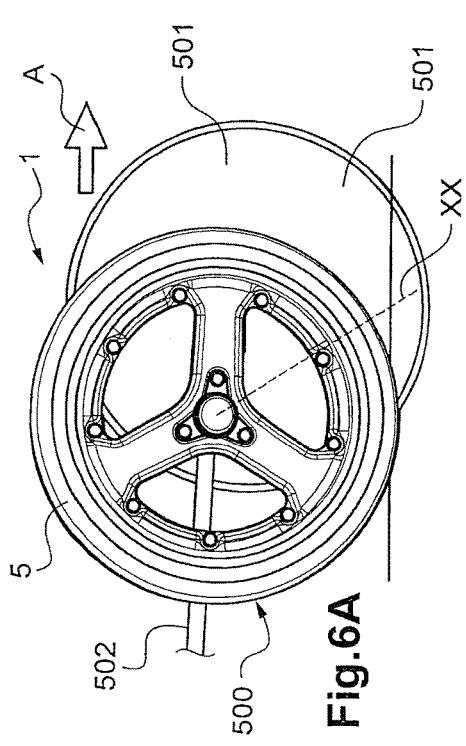
FIGS. 6A to 6D show an agricultural machine on which two tools according to the invention are mounted.
Figure 6D:
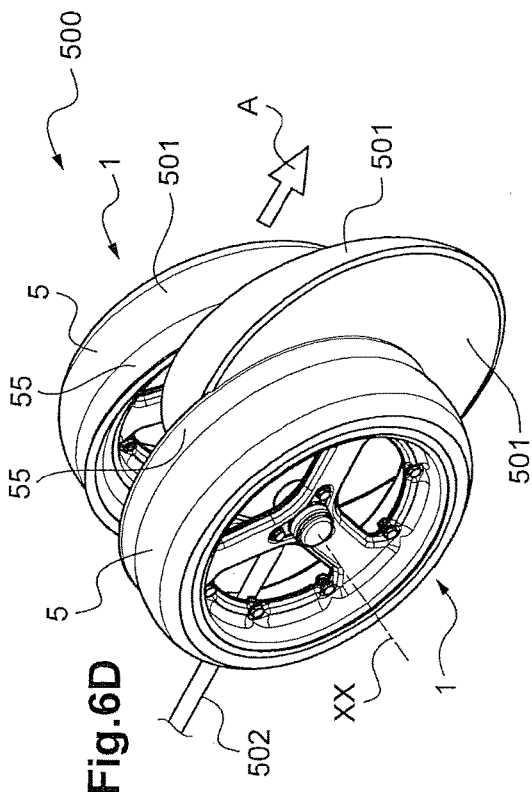
Figure 6B:
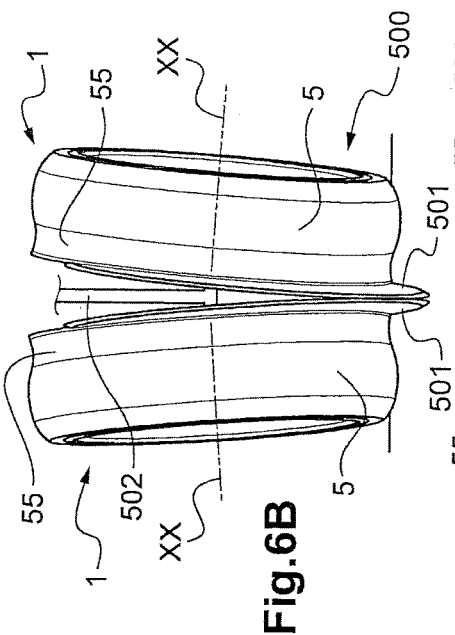

In the examples illustrated in the Figures, the lip 5 of the tire 5 is located at the side of the second flange 9. In this configuration, a large free space is provided inside the wheel 1 at the side of the lip 55. The free space particularly allows, partially in the internal space defined by the tire 5, an arm 502 of an agricultural machine frame which supports an axle provided substantially in accordance with the main axis XX, to be received. FIGS. 6A to 6B show an example of such an assembly. In this example, the arm 502 of the frame must be able to extend between the main axis XX in the region of the bearing 11 and the periphery of the wheel 1. The arm 502 of the frame must further not impair the operation of the disc 501 which is arranged in contact with a portion of the lip 55 and which partially closes a face of the wheel 1. In variants, the lip 55 may be arranged at the same side of the wheel 1 as the first flange 7, in a state facing the disc 501.

FIGS. 6A to 6D partially illustrate a sowing machine 500, in which tools 1 similar to the tool of FIGS. 1 to 5 each cooperate with a disc 501. Thus, the tool 1 forms a depth control wheel. The tool 1 can rotate freely but is fixedly joined to the disc 501 in a substantially vertical direction. In this manner, even in the presence of irregularities in a field, the disc 501 operates at a substantially constant depth in relation to the surface of the ground. Furthermore, the respective axes of the tool 1 and the disc 501 are offset relative to each other. During the advance movement of the sowing machine 500, the lip 55 of the tool 1 scrapes against one of the faces of the disc 501, thereby cleaning from it any mud and debris which could be fixed thereto. In this example of an application of the tool 1, one of the two faces of the tool 1 is inaccessible during operation: the side of the tool 1 corresponding to the external face 99 of the second flange 9 is not very accessible because of the disc 501.

As can be seen in the front view of FIG. 6B, that is to say, orientated toward the rear in the direction of advance of the sowing machine 500, the sowing machine 500 has a so-called "V-like" configuration. Two discs 501 cooperate in order to dig a furrow in the ground. The two discs 501 are mutually symmetrical in relation to a vertical plane which extends in the advance direction illustrated by the arrow A. The discs 501 are not arranged in the vertical state but are instead orientated partially toward the ground. They form, for example, an angle of approximately 5° with the vertical. A wheel 1 cooperates with each of the discs 501. The two wheels 1 have an orientation similar to that of the discs 501, although the value of the angle may be different.

Figure 6C:
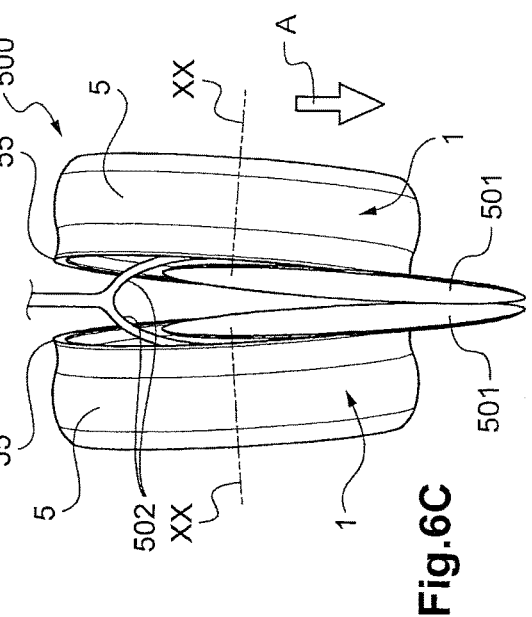

As may be seen in the plan view of FIG. 6C, the sowing machine 500 further has a "V-like" configuration in accordance with another orientation in space. The two discs 501 also form an angle with the advance direction of the sowing machine 500. In this instance, the angle is also approximately 5°. The wheels 1 have an orientation similar to that of the discs 501, although the value of the angle may be different.

As a result of those specific orientations, the loads to which the wheels 1 are subjected and which result from the resistance of the terrain and friction are great. They are greater than those to which an identical wheel 1, the rotation axis XX of which would be substantially perpendicular to the advance direction and/or horizontal, would be subjected.

The stress tend to become concentrated in the region of the hub and the connection to the axle. The configuration of the wheel body described above therefore has a specific advantage for agricultural tools having a similar configuration.

In the assembled state of the first flange 7 and the second flange 9 one on the other, the wheel member 3 has an open disc. The spaces 78 of the first flange 7 are kept free during assembly with the second flange 9. Therefore, the spaces 78 may be considered to be apertures of the wheel body 3.

The spaces 78 are defined by a closed contour 28 which is formed in this instance by:
- an edge of each of two adjacent arms 75,
- a portion of the internal surface 91 of the peripheral portion 73 of the first flange 7 and
- a portion of the external surface 83 of the central portion 71 of the first flange 7.

Therefore, the contour 28 has a cross-section of passage which is generally in the form of a portion of an annulus. In a variant, the internal ends 101 of two adjacent arms 75 are connected to each other. In that case, the contour 28 is formed by an edge of each of two adjacent arms 75 and a portion of the internal surface 91 of the peripheral portion 73 of the first flange 7.

The tool 1 further comprises at least one accessory, here in the form of a screen 2. The screen 2 generally has a form which complements at least one of the spaces 78 of the wheel body 3. The screen 2 is capable of being removably fixed to the wheel body 3, closing the corresponding space 78.

In the examples described here, the three spaces 78 of each wheel body 3 are similar. The tool 1 comprises three identical screens 2.

The screen 2 illustrated in FIG. 1, similarly to the one illustrated in FIG. 5, comprises a generally superficial portion which is formed in this instance by a main wall 21 and a profiled portion which is formed in this instance by a rim 23. The generally superficial portion terminates the profiled portion. The main wall 21 has form-fitting cooperation with respect to the space 78, that is to say, here it is generally in the form of an annulus portion. The main wall 21 has an internal surface 27 and an external surface 29 opposite the internal surface 27.

The rim 23 is in the form of a wall which forms a projection from the internal surface 27 of the main wall 21 and which extends along the contour of the main wall 21.

The screen 2 comprises a set of fixing members, here in the form of fixing lugs 24. The fixing lugs 24 are formed by cutouts in the rim 23. The fixing lugs 24 are connected to the main wall 21 by an end while the opposite end is free. The fixing lugs 24 are capable of becoming resiliently deformed, here by means of flexion, when the screen 2 is fixed to and removed from the wheel body 3.

In the example described here, the screen 2 is of plastics material. The screen 2 forms in this instance a monobloc component which is obtained by molding. Furthermore, the material used is transparent. In this manner, in the state installed on the wheel body 3, the transparent main wall 21 forms a window or a port for visual inspection. During maintenance, visual inspection is possible without removing the screen 2. In a variant, the screen 2 is opaque.

The screen 2 comprises reinforcement ribs 26. The reinforcement ribs 26 are carried by the internal surface 27. The reinforcement ribs 26 project from the internal surface 27 between two portions of the rim 23. The reinforcement ribs 26 contribute to reinforcing the main wall 21.

The screen 2 is introduced into the corresponding space 78, here provided in the first flange 7. The insertion direction substantially corresponds to the main direction XX of the wheel body 3. Thus, the rim 23 forms an insertion guide. The fixing lugs 24 bend toward the center of the main wall 21 in reaction to occurrences of contact with the wheel body 3. The resilient return force of the fixing lugs 24 generates friction forces between the screen 2 and the contour 28 of the space 78. The friction forces oppose the removal of the screen 2 from the space 78 once it has been inserted. The accidental discharge of the screen 2 from the wheel body 3 during operation is prevented. In the example described here, the free ends of the fixing lugs 24 form hooks which are capable of moving into abutment against the internal face 79 of the first flange 7. The hooks improve the retention of the screen 2 at the end of insertion.

At the end of the insertion, the contour of the main wall 21 corresponds to the contour 28 of the space 78. Thus, the space 78 is closed by the screen 2 and in particular by the main wall 21. The main wall 21 becomes flush with the contour 28. The external surface 29 of the main wall 21 is thus arranged in continuation of the external face of the wheel body 3, which face is formed here by the external face 79 of the first flange 7. In other words, the contour of the external surface 29 is aligned with the contour 28 of the space 78 in the main direction XX, substantially over the entire periphery. The external surface 29 forms a portion of the external face of the wheel body 3, here corresponding to the external face 79 of the first flange 7.

The circulation of air through the space 78 is prevented.

When all the spaces 78 of a wheel body 3 are filled by a screen 2, the wheel body 3 becomes a solid (or closed) disc type wheel body.

By applying a force to the screen 2 which exceeds the friction forces between the screen 2 and the wheel body 3, the screen 2 may be removed from the space 78. Therefore, the screen is fixed to the wheel body 3 in a removable manner. The closure of the space 78 is reversible. The solid or open nature of the wheel disc of the wheel 1 may be at least partially adjusted by fixing screens 2 in the spaces 78 and by removing them. The ability of the fixing of the screen 2 to be released is allowed by the fixing members, here by the resilient deformation of the fixing lugs 24.

The screen 2 may be considered to be a closure member or a plug which is capable of freely closing the free spaces of an open wheel disc.

The form of the external surface 29 is configured so as to be homogeneous with respect to the adjacent surface of the wheel body 3 when the screen 2 is in the installed state. In the example described here, the external surface 29 is concave. The concave form is homogeneous with respect to the cup-like form centered on the main axis XX of the portion of the external face of the first flange 7 defined by the arms 75 and the peripheral portion 73 as described above. In a variant in which the external face 79 of the wheel body is planar, the external surface 29 of the screen 2 is also planar. Generally, the continuity of the surfaces obtained in this manner when the screen 2 is in the installed state in a space 78 improves the laminar nature of a flow of air over the external face of the wheel 1.

Consequently, the moving wheel 1 has more regular aerodynamic behavior. The external faces 29 of each screen 2 form a casing for the wheel 1, against which casing the flow of air is more laminar. The movement of the wheel 1 through the air is improved.

Making the external surfaces of the tool 1 more regular allows the production of clouds of dust to be limited, in particular on dry soils.

The screen 2 further has a covering function. The introduction of material by way of the spaces 78 is prevented, for example, earth and dust. The cleaning of the tool 1 may be made easier by removing the screen 2.

The aerodynamic properties of the wheel disc are particularly important when the main plane of the wheel disc forms a non-zero angle with the advance direction A of the machine. During operation, a face of the wheel is thus partially orientated toward the front and provides a wind surface-area which is greater than any wheel whose advance direction would be aligned with its plane of rotation.

The properties of protection against mud and dust are particularly important when the main plane of the wheel disc forms a non-zero angle with the vertical, for example, when the wheel has an external face which is partially orientated in the direction of the ground.

Such configurations of wheels, which are critical in terms of operation, are combined, for example, in the sowing machine 500 of FIGS. 6A to 6D with the "V-like" configuration, both in the front view and in the plan view.

The embodiment of FIG. 5 is similar to the one of FIGS. 1 to 4. The functionally identical portions therein have the same reference numerals. The wheel body 3 differs from the preceding embodiment in that the second flange is homologous to the first flange 7. Thus, the second flange comprises a central portion and arms. In the assembled state, the wheel body 3 has a rim 121 which is formed together by the peripheral portion 73 of the first flange 7 and the homologous portion of the second flange. The central portion of the second flange receives the hub formed by the central portion 71 of the first flange 7.

In the embodiment of FIG. 5, the screen 2 further comprises an engaging member 25 for a tool or fingers, which in this instance is in the form of an indentation which is provided in the region of the contour 28. The engaging member 25 forms an exception to the homogeneity of the surface and the form-fitting correspondence of the contour 28 of the space 78 with respect to the contour of the main wall 21. The engaging member 25 is configured to allow the withdrawal of the screen 2 from the wheel body 3 by pulling from a face of the wheel body 3. This is particularly advantageous when the screen 2 is not accessible from the opposite face of the wheel 1. For example, in the configuration illustrated in FIGS. 6A to 6D, it is difficult to push the screens 2 from the side of the second flange 9 because of the disc 501 which impairs access. In a variant, the engaging member is provided in the wheel body 3, for example, opposite the engaging member 25 as illustrated in FIG. 5.

In variants which combine a set of fixing members including a clip-fitting system and an engaging member 25, the engaging member 25 may allow the clip-fitting to be unlocked.

In an embodiment illustrated in FIGS. 7 and 8, the screen 2 comprises at least two components which are configured to be assembled one on the other in a removable manner, gripping the contour 28 of the space 78. In this manner, the two faces of the wheel 1 may be made regular. The aerodynamic behavior is further improved.

In an embodiment, the screen is capable of closing at least two spaces 78. For example, the screen generally has the form of an annulus which is capable of closing the three spaces 78, partially covering the arms 75. The screen thus comprises three components which substantially correspond to the three screens of the embodiment of FIGS. 1 to 5, which screens are connected together by connection portions which press against the external face of the arms 75 of the wheel body 3 when the screen is in the installed state. Such a screen may be produced in one operation and in a single piece, for example, by molding. In comparison, three separate screens 2 must be produced for the embodiment of FIGS. 1 to 5. Furthermore, a single screen for occupying a plurality of spaces reduces the risk of losing one of the screens.

In a variant, the set of fixing members comprises, for example, a pivot connection between the screen and the wheel body combined with a locking member. The screen is then in the form of a shutter or a flap which may be either locked so as to close the apertures or unlocked, leaving the apertures open and remaining connected to the wheel body by means of the pivot connection. Such a variant may, for example, be obtained by producing the first flange 7 and the screens in a single piece by plastics molding. The pivot connection is then formed by flexible connections between the screens and the wheel body.

In another variant, the wheel body and the screens may be produced from a monobloc component and connected by detachable or divisible portions. In that case, a user has a solid-disc wheel and may, if he wishes, separate the screens from the wheel body in order to obtain an open-disc wheel.

In the embodiments described here, the wheel body is obtained by assembling two flanges face to face. In a variant, the wheel body is formed from a monobloc component.

As a result of the cooperation between the wheel body and the accessory of a tool according to the invention, the wheel may have an open disc or a closed disc. As a result of simple operations of insertion and removal of the screen, an operator may rapidly adapt such a tool to the conditions of the terrain.

When the screens are fixed in the wheel body, the introduction of earth or any other contaminant into the internal portion of the tool is limited. For all that, the interior of the tool remains accessible during maintenance and in particular for cleaning, by removing the screens.

The invention may be considered to be a kit. The kit thus comprises at least one screen which is as described above and which is capable of being associated with a wheel body. The kit may comprise a wheel body which is compatible with the screen. In a variant, the kit may not have any wheel body and the screens may be compatible with existing wheel bodies. Such screens have a low production cost.

The invention is not limited to the examples of tools described above, merely by way of example, but also includes all the variants which the person skilled in the art may envisage within the scope of the appended claims.

The invention claimed is:

1. An agricultural machine tool comprising a wheel body which includes a hub, a rim and a wheel disc, the wheel disc comprising only two or three arms which each connect the hub and the rim to each other, two or three apertures, each provided between two arms and the rim, and having a closed contour, said tool comprising:
 a component which forms an accessory having a profiled portion having a shape which generally corresponds to the closed contour, and a generally superficial portion which terminates the profiled portion; and
 a set of fixing members,
 wherein the profiled portion is configured to be introduced at one side of the wheel body into the aperture thereby closing the aperture with form-fitting cooperation, as far as a final position in which the superficial portion moves into a flush state with the arms, at least in a region of the contour, whilst the set of fixing members ensures the retention of the component in that final position, and
 wherein the two or three arms occupy a smaller surface of the wheel disc than the two or three apertures.

2. The tool according to claim 1, wherein at least one of the wheel body and the accessory comprises an engaging member for a device or fingers, the engaging member being configured to allow the withdrawal of the accessory from the wheel body by pulling from one of two faces of the wheel body.

3. The tool according to claim 1, wherein the accessory is formed from at least two components, the two components and the set of fixing members being configured so as to assemble the two components one on the other in a removable manner, enclosing the contour of the aperture.

4. The tool according to claim 1, wherein the accessory comprises at least two similar, generally superficial portions, each of the generally superficial portions closing a respective aperture of the at least one aperture.

5. The tool according to claim 1, wherein the generally superficial portion is transparent.

6. The tool according to claim 1, wherein the set of fixing members comprises at least one fixing lug, the removability of the fixing members being allowed by the resilient deformation of the fixing lug.

7. The tool according to claim 1, wherein the aperture is delimited by respective edges of the two arms and the rim.

8. The tool according to claim 1, wherein the accessory comprises reinforcement ribs which are carried by a surface of the generally superficial portion, the reinforcement ribs contributing to reinforcing the generally superficial portion.

9. The tool according to claim 1, wherein the wheel body is formed by the assembly of a first flange and a second flange which mount one on the other, the first flange comprises a central portion, a peripheral portion of generally annular form and at least two arms which connect the central portion and the peripheral portion to each other, the second flange is homologous to the peripheral portion of the first flange, in an assembled state, the rim of the wheel body is formed together by the peripheral portion of the first flange and the second flange and the hub which is formed by the central portion of the first flange, the first flange and the second flange fixes to each other and the accessory fixes to the first flange.

10. An adaptation kit comprising at least one accessory which removably fixes to an existing wheel body so as to form an agricultural machine tool according to claim 1.

11. The tool according to claim 1, wherein the accessory includes an internal surface facing in a direction of an interior of the wheel body, and an external surface facing in an opposite direction of the internal surface, and wherein reinforcement ribs are located on the internal surface to reinforce the generally superficial portion.

12. The tool according to claim 11, wherein the reinforcement ribs project from the internal surface between two portions of the rim.

13. The tool according to claim 1, wherein the wheel disc comprises only two arms and the two apertures extend from one side of the wheel to a second side of the wheel opposite the first side.

* * * * *